US010213678B2

(12) United States Patent
Mattiangeli

(10) Patent No.: US 10,213,678 B2
(45) Date of Patent: Feb. 26, 2019

(54) DETACHABLE TRACKED UNIT FOR POWERING SNOWBOARDS

(71) Applicant: Luciano Mattiangeli, Terni (TR) (IT)

(72) Inventor: Luciano Mattiangeli, Terni (TR) (IT)

( * ) Notice: Subject to any disclaimer, the term of this patent is extended or adjusted under 35 U.S.C. 154(b) by 0 days.

(21) Appl. No.: 15/541,589

(22) PCT Filed: Dec. 14, 2015

(86) PCT No.: PCT/IB2015/059568
§ 371 (c)(1),
(2) Date: Jul. 5, 2017

(87) PCT Pub. No.: WO2016/110759
PCT Pub. Date: Jul. 14, 2016

(65) Prior Publication Data
US 2017/0361202 A1    Dec. 21, 2017

(30) Foreign Application Priority Data

Jan. 8, 2015   (IT) .............................. TR2015A0001

(51) Int. Cl.
*A63C 5/03*  (2006.01)
*A63C 5/08*  (2006.01)
*B62D 55/084* (2006.01)

(52) U.S. Cl.
CPC ................. *A63C 5/085* (2013.01); *A63C 5/03* (2013.01); *A63C 5/08* (2013.01); *B62D 55/084* (2013.01); *A63C 2203/06* (2013.01)

(58) Field of Classification Search
CPC ......... A63C 5/03; A63C 5/035; B62M 27/012
See application file for complete search history.

(56) References Cited

U.S. PATENT DOCUMENTS 4,984,648 A * 1/1991 Strzok ...................... A63C 5/08
                                                      180/181
5,305,846 A * 4/1994 Martin .................... A63C 5/085
                                                      180/181
(Continued)

FOREIGN PATENT DOCUMENTS

DE   202012101242 U1   4/2012
DE   102012100549 A1   7/2013
(Continued)

OTHER PUBLICATIONS

International Search Report and Written Opinion of the International Searching Authority, PCT/IB2015/059568, EP/ISA, dated Jul. 3, 2016.

*Primary Examiner* — James A Shriver, II
*Assistant Examiner* — Vaughn Coolman
(74) *Attorney, Agent, or Firm* — Nancy J. Flint, Attorney At Law, P.A.; Nancy J. Flint, Esq.

(57) ABSTRACT

Detachable propelling apparatus to be fastened to a snowboard in order to propel it uphill. Said apparatus is equipped with foldable or removable tracks, being these tracks powered by either an engine, or a motor or a turbine. The apparatus is integral with an apt adjustable attachment plate, that is directly fastenable to the feet rests (boots attachments) holes of the snowboard. The invention is completed by a rucksack for transporting tracks and batteries, with an opportune frame for protecting the back of the wearer in case of fall and a remote control, in case equipped with movement sensors. The invention is a solution for the technical problem of powering a snowboard limiting the impact of such fixture on the snowboard itself.

14 Claims, 10 Drawing Sheets

(56) References Cited

U.S. PATENT DOCUMENTS

| | | | | |
|---|---|---|---|---|
| 5,518,080 | A * | 5/1996 | Pertile | B62B 3/06 180/190 |
| 5,765,854 | A * | 6/1998 | Moore | A63C 5/03 280/14.23 |
| 6,698,540 | B1 * | 3/2004 | Decker, Jr. | A63C 5/085 180/11 |
| 6,725,959 | B1 * | 4/2004 | Shea | B62K 3/002 180/190 |
| 7,811,217 | B2 * | 10/2010 | Odien | A63B 21/0058 482/147 |
| 8,844,664 | B1 * | 9/2014 | Decker, Jr. | B62M 27/02 180/181 |
| 8,991,541 | B1 * | 3/2015 | Maier | A63C 5/08 180/181 |
| 9,862,433 | B2 * | 1/2018 | Martel | B62D 51/007 |
| 2004/0154849 | A1 * | 8/2004 | Fodor | A63C 5/08 180/181 |
| 2007/0205034 | A1 * | 9/2007 | Wier | A63C 5/03 180/181 |
| 2009/0026731 | A1 * | 1/2009 | Stewart | A63C 5/06 280/611 |
| 2009/0255745 | A1 * | 10/2009 | Kukowski | B62M 27/02 180/190 |
| 2011/0006504 | A1 * | 1/2011 | Arnol | A63C 5/06 280/606 |

FOREIGN PATENT DOCUMENTS

| | | |
|---|---|---|
| FR | 2673545 A1 | 9/1992 |
| KR | 20120035068 A | 4/2012 |
| WO | 1994015683 A1 | 7/1994 |

* cited by examiner

DETACHABLE TRACKED UNIT FOR POWERING SNOWBOARDS

TECHNICAL FIELD

The invention is relevant to the powering of a snowboard, with no need to irreversibly modify it, in order to obtain a transport mean which is self-explanatory and user-friendly. Therefore said invention is conceived for ski tracks and snow-parks, in particular on smooth slopes, flattish or slightly uphill, where ski-lifts or similar devices are not present, in order to allow the user to be transported safely and effortlessly.

STATE OF THE ART

A snowboard, in se, is not usable uphill, and this poses a problem for which former proposed systems of powering unit offer a solution.

U.S. Pat. No. 8,844,664 B1 describes an autonomous power unit, not attached to the snowboard, located in the rear and connected to the snowboard by an elastic joint.

Patent US 2004/0154849 A1 describes an invention for a propelling apparatus integral with the snowboard, located in the rear with the power unit above and the tracks below the snowboard, respectively.

Patent DE 10113681 A1 describes a power/tracked apparatus that is located in the center of the snowboard, which must be first modified with a large cut-out to lodge the track.

The Application U.S. Pat. No. 5,662,186 A describes a propelling apparatus mounted on a plate, that, in its turn, is fastened to the snowboard; the power unit is mounted above the plate and the tracks contact the ground through a large cut-out to be made in the center of the snowboard; for the fastening of the plate to the snowboard, it is necessary to drill new holes, in addition to those already present in the snowboard for the feet rests.

Therefore in all the previous proposals above, propulsion is accomplished by a single track and the unit cannot be removed from the snowboard, which needs irreversible modifications.

Other examples of units for powering snowboards are described in DE 102012100549 A1 and in DE 202012101242 U1.

SCOPE AND SUMMARY OF THE INVENTION

The scope of the apparatus relevant to the present patent application, is to provide a unit to be installed on a standard snowboard, in order to make it self-propelled and drive it uphill; said unit, the object of the patent application, is detachable from the snowboard, the latter not requiring any modification; once said unit is detached, the snowboard is still usable in the traditional way.

The scope is achieved mounting the main body of the unit, the main box, on sliding slots in two bottom plates; the latter have holes matching the holes already present in any standard snowboard and normally used to fasten the feet rests.

The sliding slots allow the securing of the bottom plates sandwiched between the snowboard and the feet rests, whatever is the distance between these rests; when the feet rests are fastened with conventional means to the snowboard, also the bottom plates are secured to the same snowboard; then the main body of the power unit is locked into position on the bottom plates, with no possible further sliding.

Referring to existing systems, the unit here described and applied to a patent, surprisingly does not require any modification to the snowboard, therefore it can be assembled and disassembled at will, and does not alter the standard functionality of the snowboard.

An additional scope of the present patent application is to provide a unit to be installed on a standard snowboard, in order to make it self-propelled and steerable. This is achieved by means of two tracks, each one on a different side of the snowboard and connected to a corresponding power transmission link on the unit main body or box.

Each track is cantilever with respect to the main body of the unit, therefore it does not interfere with the snowboard; each track is independently driven, therefore its speed can be independently varied; hence the powered snowboard can coast even in a confined area, with a very small radius of curvature.

Another aim of the apparatus relevant to the present application is to give an easy control to its user. This is achieved by means of a remote control unit, in its simplest form a pad with a joystick connected via cable to the power unit; it is also possible to use a wireless connection, e.g. via an app on a smartphone.

The scope, as clearly described here and further, is achieved, in the apparatus relevant to the present application, by means of a power unit, hosted in a (central) main box, slotted to and sliding on a couple of bottom plates. The latter have holes that can be adjusted to match, at least partially, the holes present in snowboards for the foot rests.

On each side of said main box a power transmission link is located; each link drives the power shaft of the corresponding track.

The shaft of each track is connected to the corresponding power link by a grooved profile joint, that can transmit power in both rotational directions. Off-the-shelf connectors (male/female) are available on the market for the easiest configuration.

In a more evolved configuration the coupling can be obtained through a fast-lock system, e.g. spring operated, in order to get an easy assembling/disassembling of the tracks without need for tools, and facilitate the transportation of the entire apparatus relevant to the present application.

In another evolved configuration, the tracks can be made foldable by swiveling around an axis parallel to the main axis of the snowboard, hence reducing the volume occupied by the apparatus when non in use, and facilitating its storage/transportation.

Different solutions for the power unit are possible: electric motor, inner combustion engine, turbine engine. The power unit is hosted in the apparatus main box and independently coupled with the power transmission link; where each link drives the power shaft of the corresponding track.

A remote control can direct the power independently to each track, so that the snowboard can coast or even rotate on place.

A particularly simple and cheap form of the propelling apparatus, usable on all standard snowboards, which have fixed-distance holes to attach the feet rests, includes a central box mounted on a single bottom plate, with extensions protruding from the front and the rear of said box, with holes at least partially matching those already present on the snowboard for the feet rests.

BRIEF DESCRIPTION OF THE DRAWINGS

An exploded view of the tracked apparatus relevant to the present patent application is given in FIG. 1: (3) is the mounting plate with the front (4) and rear (5) holes at least partially matching those already present on the snowboard for, respectively, the front (6) and rear (7) foot rest.

The main box (1) is visible above said plate (3); inside such box at least a powering unit is hosted, with a power transmission link (2, 10) on each side; to each link a profiled connector (9, 12) is locked, being this connector the opposite extremity of a shaft protruding from each track (8, 11).

A remote control unit (13) is connected via a cable to the main body of the invention.

Figure 1:
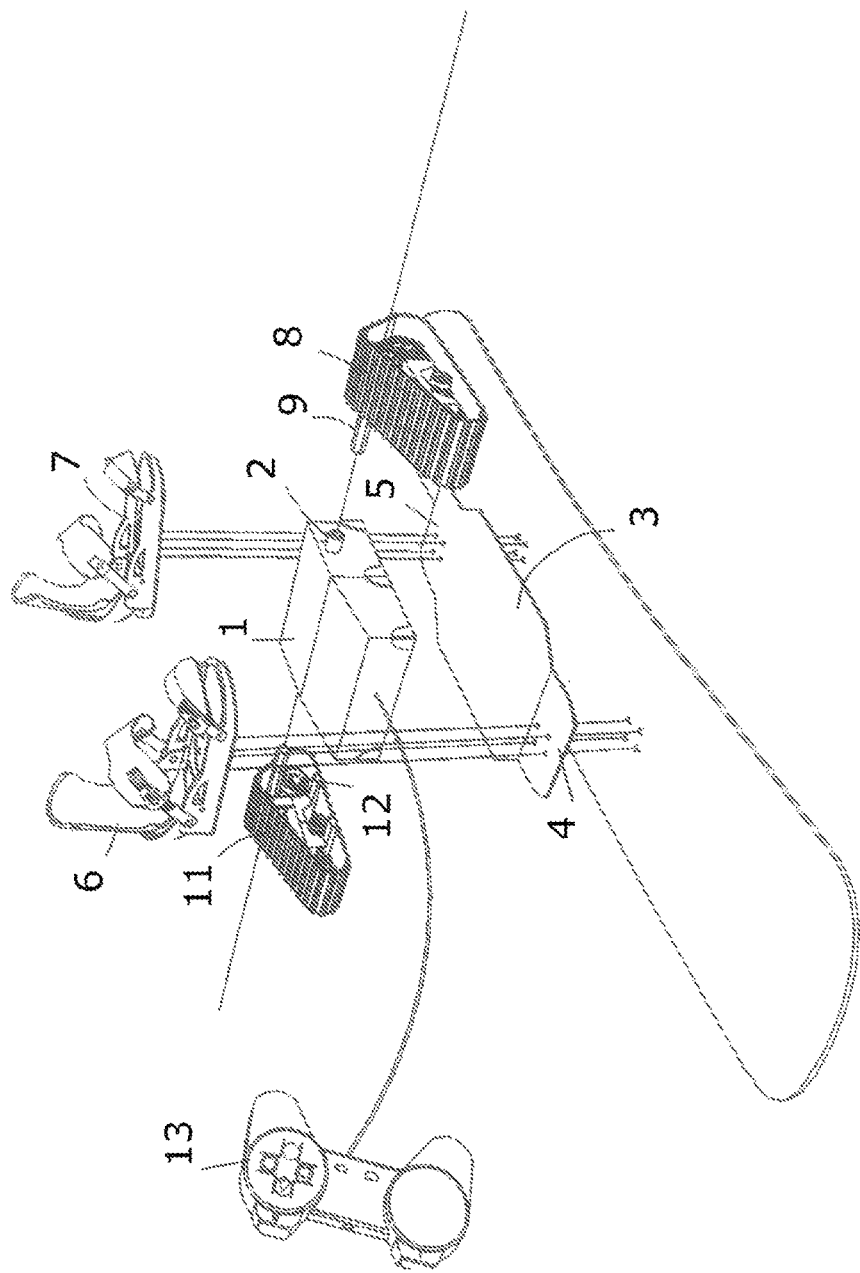
Figure 2:
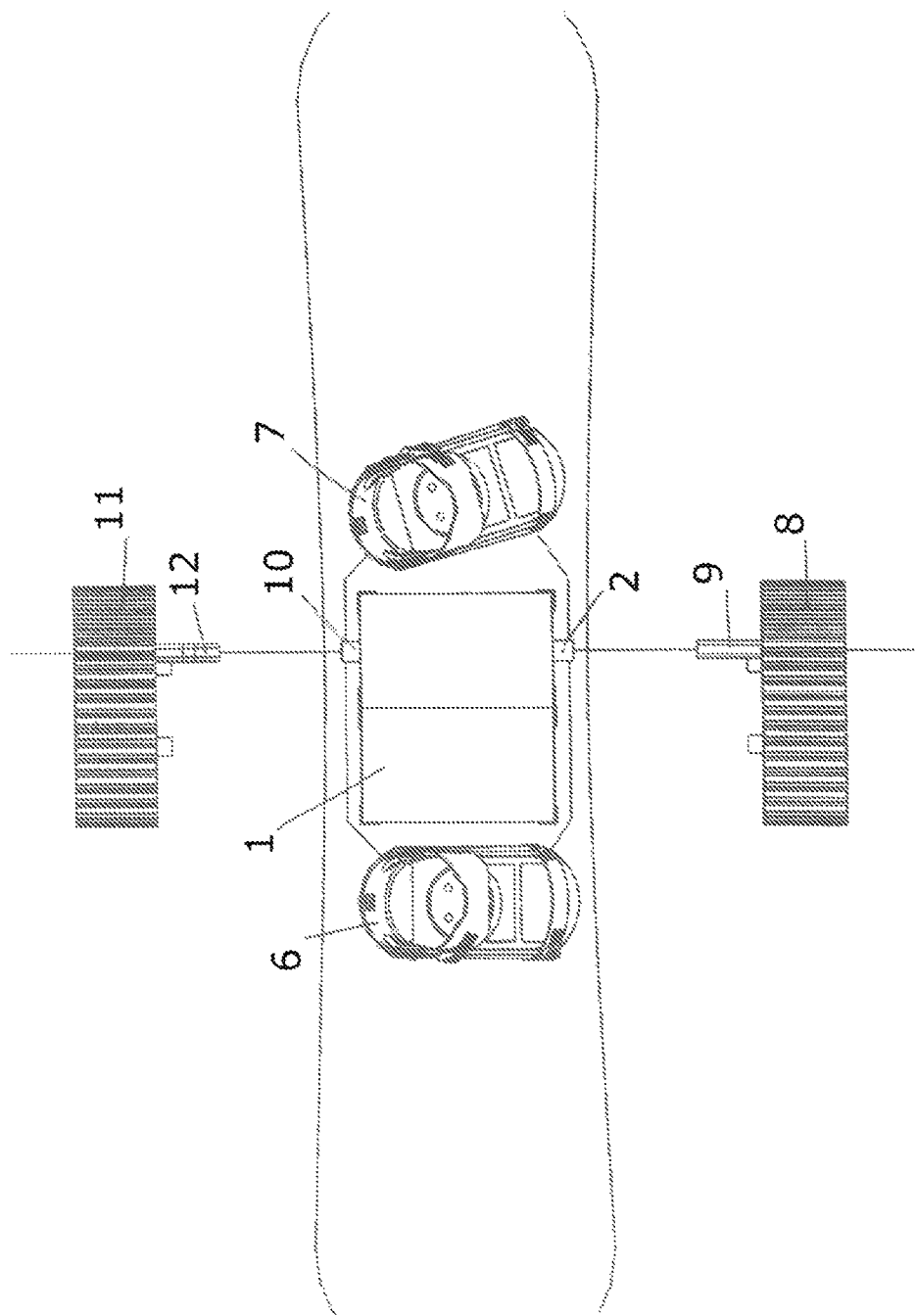

A (partially) exploded top view is given in FIG. 2: it shows the same arrangement of FIG. 1.

Figure 3:
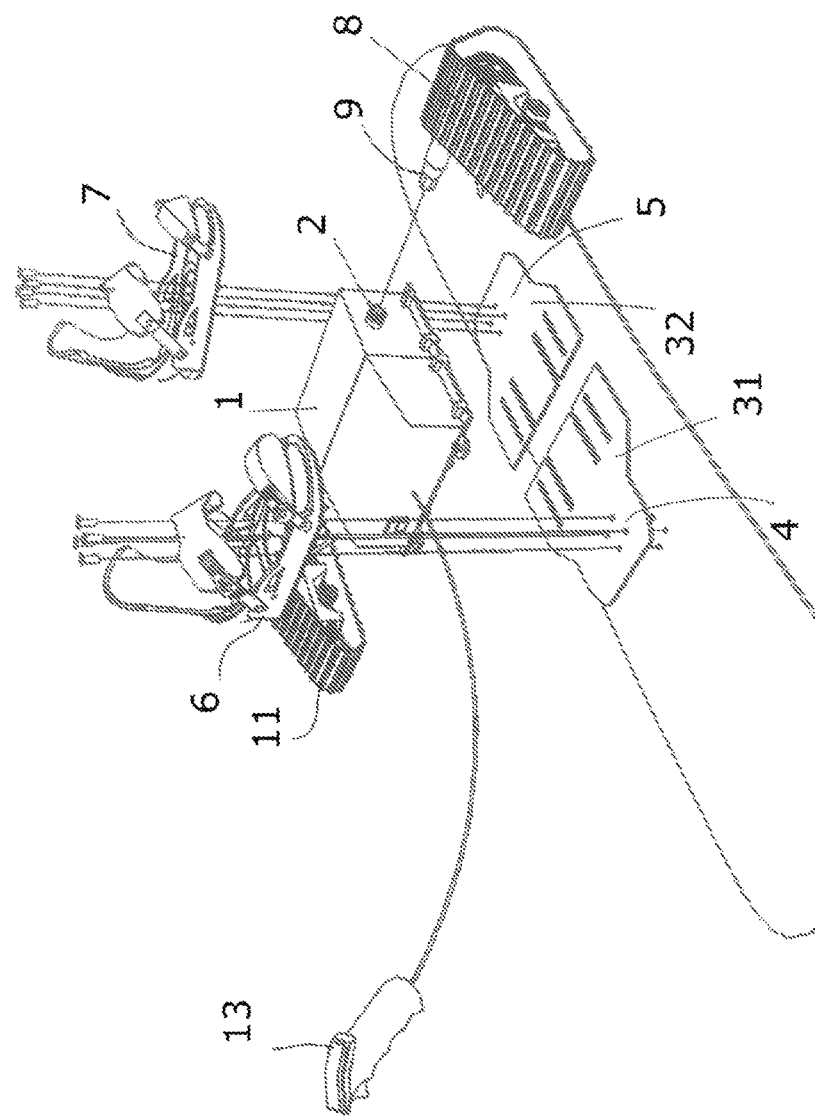
Figure 4:
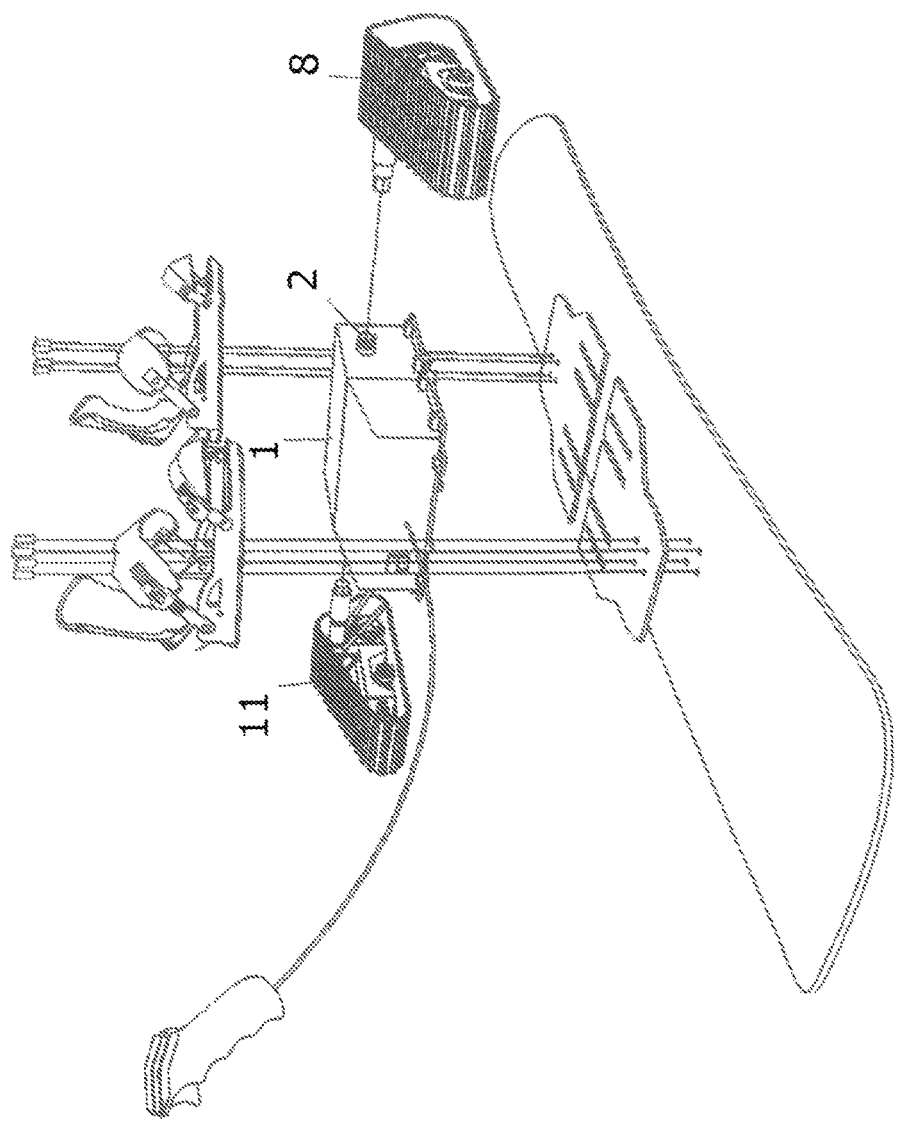
Figure 5:
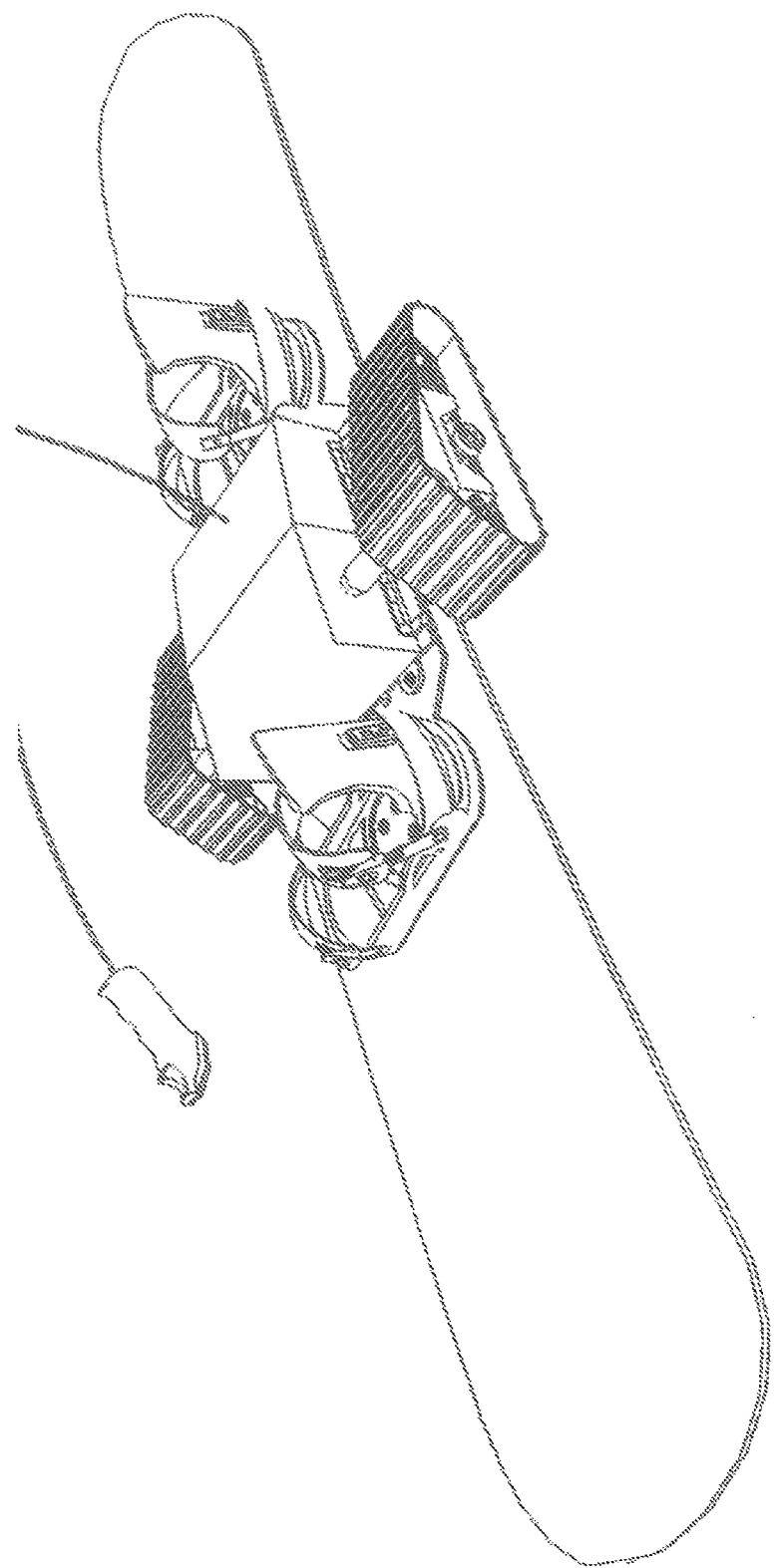
Figure 6:
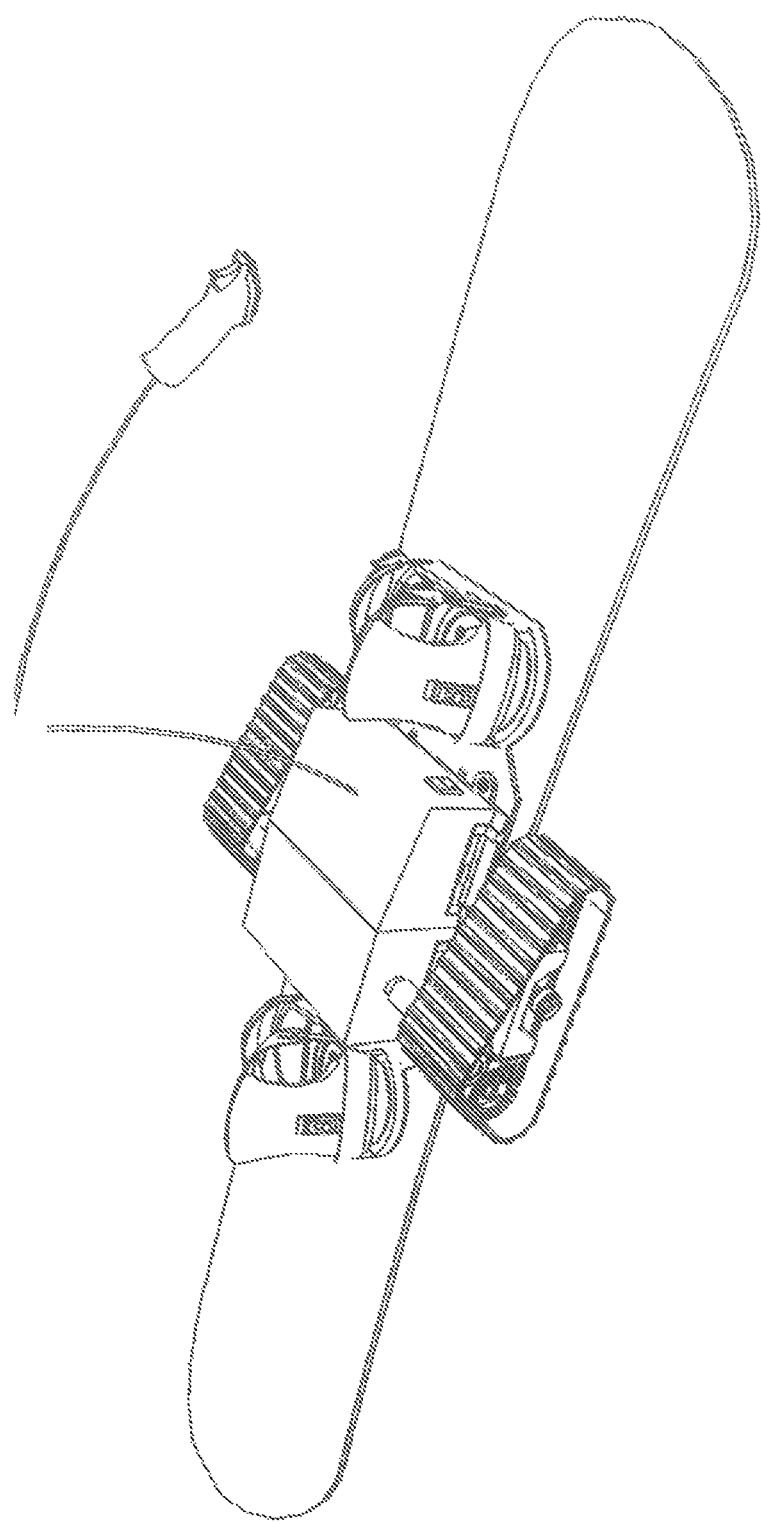
Figure 7:
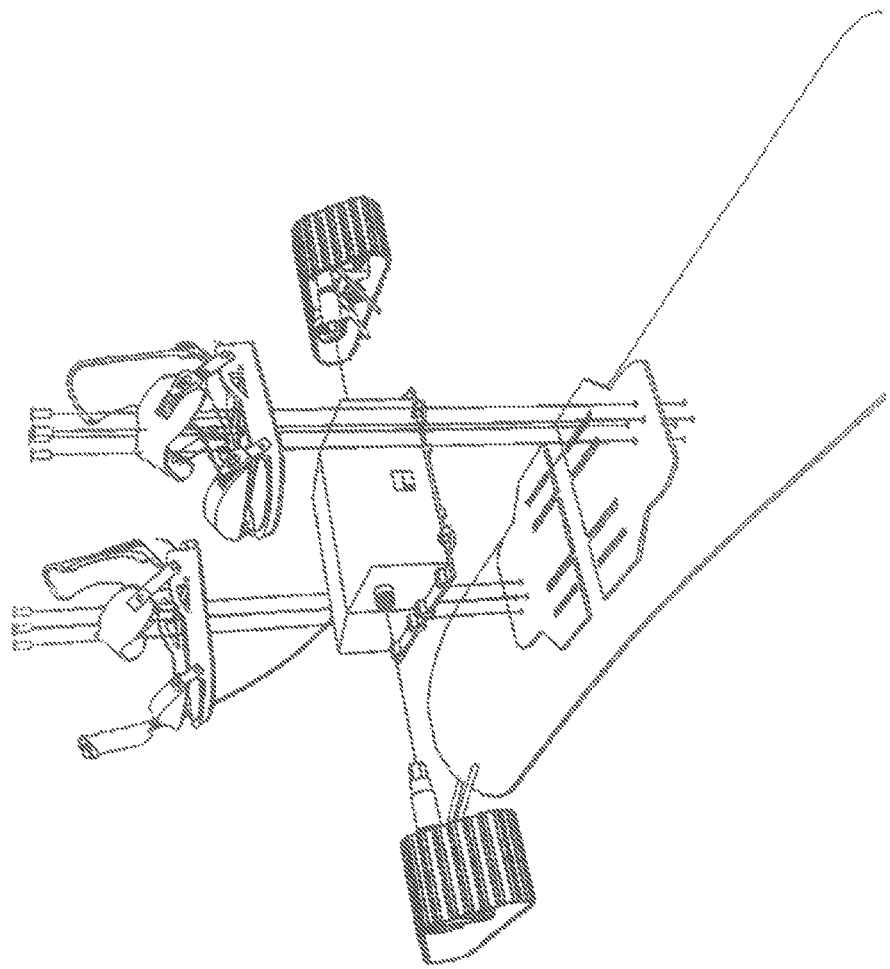
Figure 8:
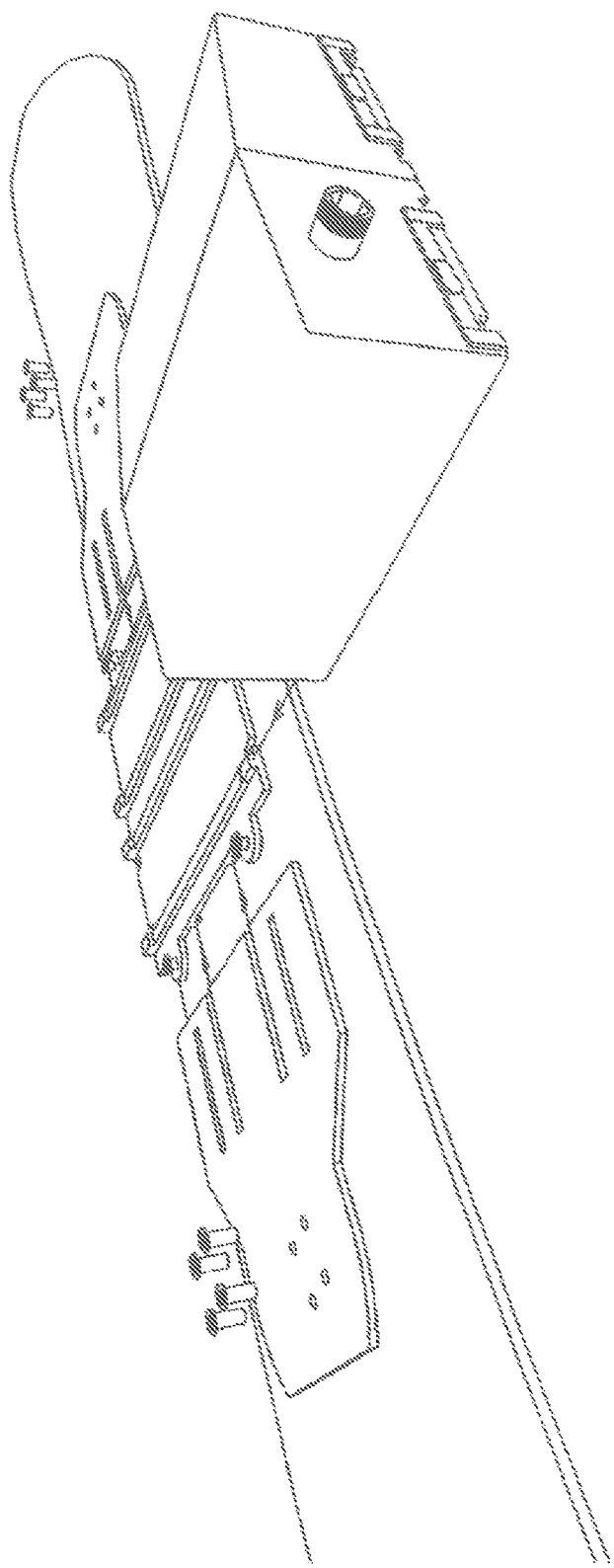
Figure 9:
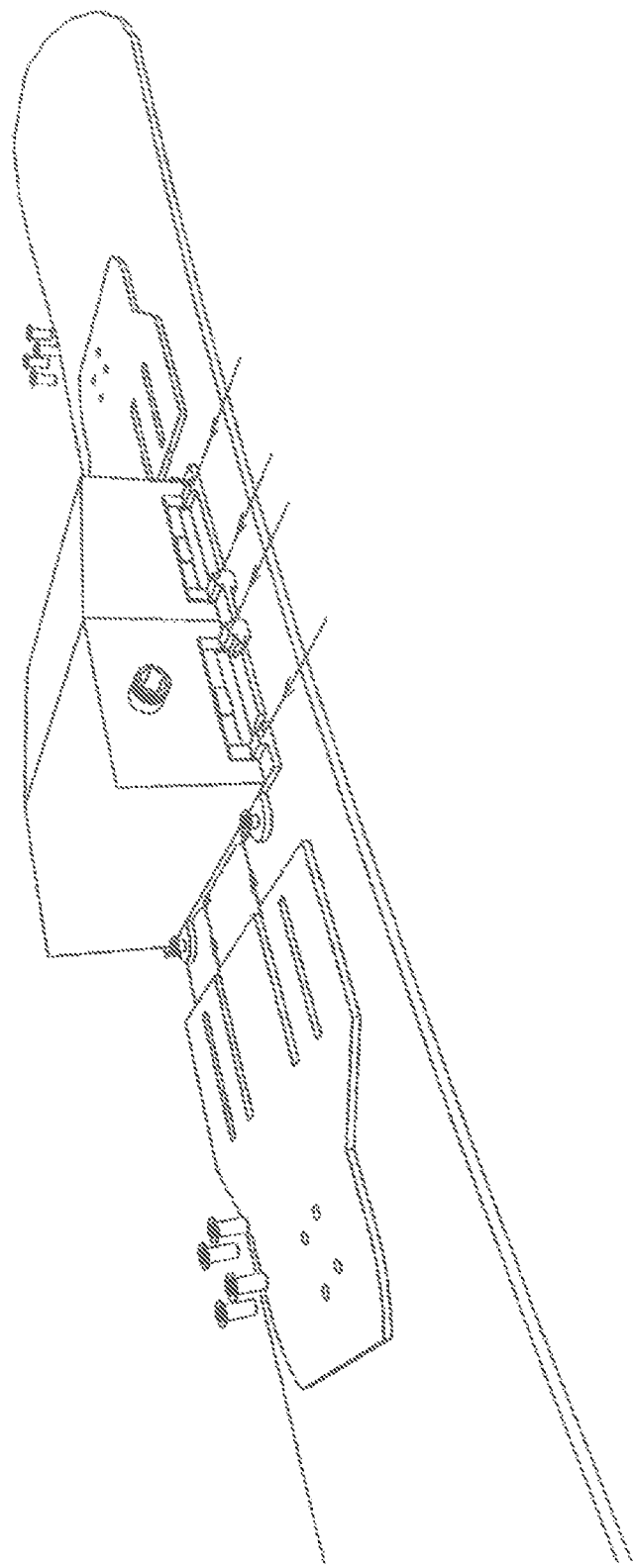
Figure 10:
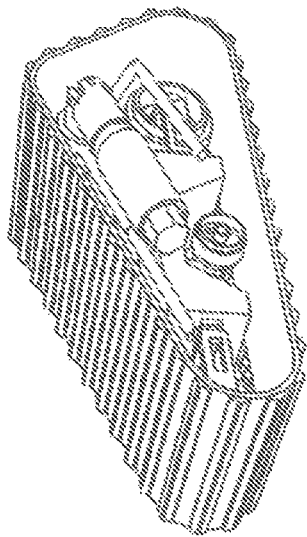
Figure 10:
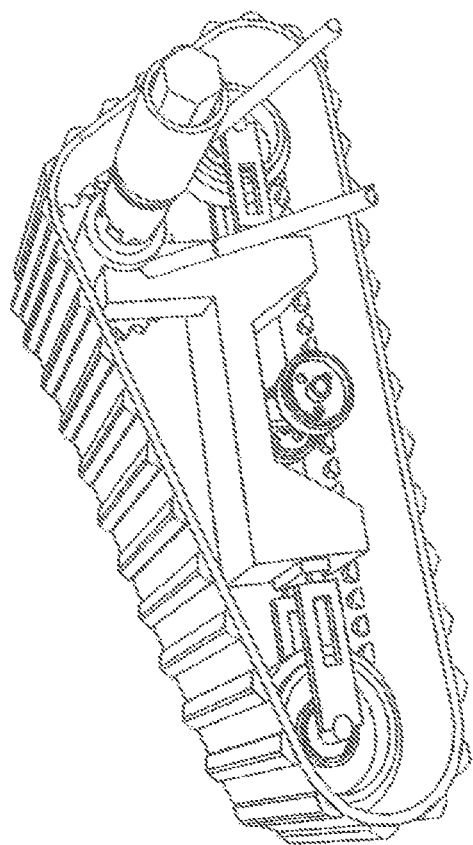

A different arrangement for the same apparatus is shown in FIG. 3, where the main box (1) is slotted both to a front bottom plate (31) and a rear bottom plate (32); locking fixtures are used to secure the main box (1) in place with respect to the two front (31) and rear (32) plates, once these plates have been bolted trough the holes already present on the snowboard for, respectively, the front (6) and rear (7) foot rest.

FIGS. 4 to 10 show further details of the various versions of the apparatus according to the present application.

DETAILED DESCRIPTION OF AN EMBODIMENT OF THE INVENTION

Here, as an example not limiting the range of possible forms the invention can assume, a detailed description of the apparatus is given, relevant to the attached drawings; said description illustrates other characteristics of the invention and its implicit benefits.

A fully-fledged form of said invention includes a main central box (1), hosting at least a power unit, being the latter a motor, an engine or other type of power and motion source. The same box (1) opportunely hosts also the energy source for the power unit, e.g. a rechargeable battery (for an electric motor) or a fuel tank (for a combustion engine).

On each side of said main box (1) a power transmission link (2, 10) is located; each link drives the power shaft of the corresponding track (8, 11), through a power connector (9, 12).

A different version, slightly more difficult to use, can have just one power transmission link and one track, on one side only.

Very aptly, the two power transmission links can be independently powered, leading to an increased maneuverability, via a common power unit equipped with a differential transmission or a power distributor or similar known device, or via two independent power units, one for each track.

In its simplest form, suitable to all snowboards having the front (6) and rear (7) foot rest at the same distance between them, the unit main box (1) is mounted on a bottom plate (3) having front (4) and rear (5) holes that match, at least partially, the standard holes present in snowboards to secure the front (6) and rear (7) foot rest.

In a more evolved form, suitable to snowboards having the front (6) and rear (7) foot rest at various distance between them, the unit main box (1) is not mounted on a single bottom plate, but is slotted to and sliding on a bottom front plate (31) and a bottom rear plate (32). The bottom front and rear plates have holes that can be adjusted to match, at least partially, the holes present in snowboards for foot rests, whatever their span is.

Therefore the matching of the bottom plates (31, 32) with the snowboard can be adjusted with respect to the sliding main box (1). Once the bottom plates are fixed, the sliding of the main box is blocked with opportune locking devices. The maneuverability of the snowboard is improved by a remote control unit, e.g. a pad with a joystick connected via cable to the power unit; it is also possible to use a wireless connection, e.g. via an app on a smartphone.

The invention claimed is:

1. An apparatus for powering a snowboard comprising:
   at least one power unit housed in a central box, each at least one power unit comprising at least one power transmission link;
   a front bottom plate and a separate rear bottom plate disposed along an axis of the longitudinal length of a snowboard, wherein the front bottom plate and the rear bottom plate each comprise a plurality of holes, wherein at least one of the plurality of holes in each of the front bottom plate and the rear bottom plate matches at least one attachment hole in a snowboard for boot attachment fixtures, wherein further each of the front bottom plate and the rear bottom plate are sandwiched between a bottom of one boot attachment fixture and a top surface of the snowboard when the boot attachment fixures are fastened via conventional methods to the snowboard;
   an intermediate plate disposed in a position on top of the front bottom plate and the rear botttom plate, wherein the intermediate plate is slidingly coupled to each of the front bottom plate and the rear bottom plate in a direction substantially parallel to said axis; and
   at least one tracked unit disposed on a side of the snowboard, each tracked unit comprising a power connector driving a power shaft, wherein the power connector is linked to at least one power transmission link,
   wherein each at least one power unit provides power to the power shaft of each at least one tracked unit via at least one power transmission link and power connector to propel the snowboard,
   wherein the central box comprises a main body slidingly coupled to the intermediate plate in a direction substantially transverse to said axis.

2. The apparatus of claim 1, wherein each tracked unit is operated via provision of power from at least one power unit independently of any other tracked unit.

3. The apparatus of claim 2, wherein each tracked unit comprises a cantilever axle having an extremity mated to one of the at least one power transmission links.

4. The apparatus of claim 3, wherein the extremity of each cantilever axle transmits torque in both rotational directions.

5. The apparatus of claim 1, wherein each tracked unit comprises a cantilever axle having an extremity mated to one of the at least one power transmission links.

6. The apparatus of claim 5, wherein the extremity of each cantilever axle transmits torque in both rotational directions.

7. The apparatus of claim 5, wherein at least one of the at least one power units comprises a motor housed in the central box jointly with a battery pack.

8. The apparatus of claim 5, wherein at least one of the at least one power units comprises an engine housed in the central box jointly with a fuel tank.

9. The apparatus of claim 1, wherein at least one of the at least one power units is controlled by a remote control pad.

10. The apparatus of claim 9, wherein the remote control pad is wireless.

11. The apparatus of claim 1, wherein at least one of the at least one power units comprises a motor housed in the central box jointly with a battery pack.

12. The apparatus of claim 1, wherein at least one of the at least one power units comprises a piston engine housed in the central box jointly with a fuel tank.

13. The apparatus of claim 1, wherein at least one of the at least one power units comprises a turbine engine housed in the central box jointly with a fuel tank.

14. The apparatus of claim 1, wherein the intermediate plate is slidingly coupled to each of the front bottom plate and the rear bottom plate via a sliding coupling, wherein the sliding coupling locks in at least one position via at least one fastening mechanism.

* * * * *